United States Patent

Gouirand

[15] 3,689,054
[45] Sept. 5, 1972

[54] COMBINED VEHICLE CHASSIS AND AIR SUSPENSION SYSTEM

[72] Inventor: Rene Gouirand, New York, N.Y.
[73] Assignee: Mercadante, Greenwich, Conn.
[22] Filed: Jan. 28, 1971
[21] Appl. No.: 110,703

[52] U.S. Cl. ................. 267/68, 267/71 P, 280/106.5
[51] Int. Cl. ............................................. B60r 19/00
[58] Field of Search ............. 293/D.002, 68, 71 P, 71; 280/106.5

[56] References Cited

UNITED STATES PATENTS

| | | | |
|---|---|---|---|
| 2,914,339 | 1/1959 | Gouirand | 293/71 P |
| 1,096,609 | 5/1914 | Dodge | 293/D.002 |
| 2,999,697 | 9/1961 | Winget | 293/60 X |

*Primary Examiner*—Philip Goodman
*Attorney*—F. Eugene Davis, IV, Robert H. Ware and Mattern, Ware & Davis

[57] ABSTRACT

A combined vehicle chassis and air suspension wherein elongated air bags having a substantially circular cross-section are physically located within and supported by inverted, U-shaped chassis members. Under no load conditions, the air bags contact the chassis members on only a portion of the circumference and as the load increases, the contact surface between the air bag and the chassis members increases, thereby increasing spring stiffness. The side portions of the inverted U-shaped chassis members are spaced from the sides of the air bags under no load conditions. Under heavy load and when the car turns around a curve, the side portions of the U-shaped members prevent side-sway of the vehicle. Air-bumpers are provided which are coupled to the air system of the suspension system. The air in the air-bumpers acts as an additional reservoir for the air bags of the suspension system to effectively soften the ride of the vehicle and additionally, absorb vehicle impacts.

9 Claims, 7 Drawing Figures

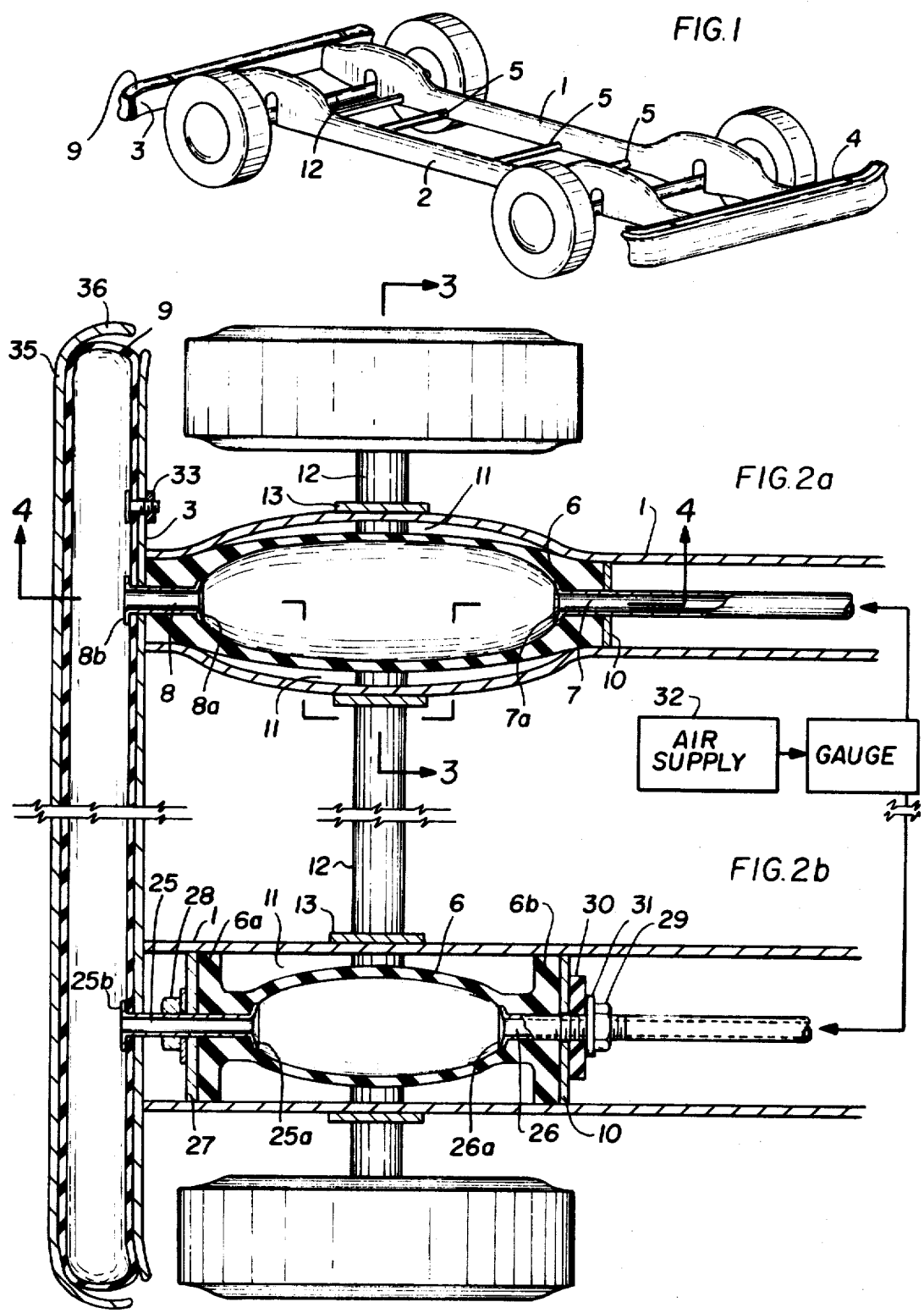

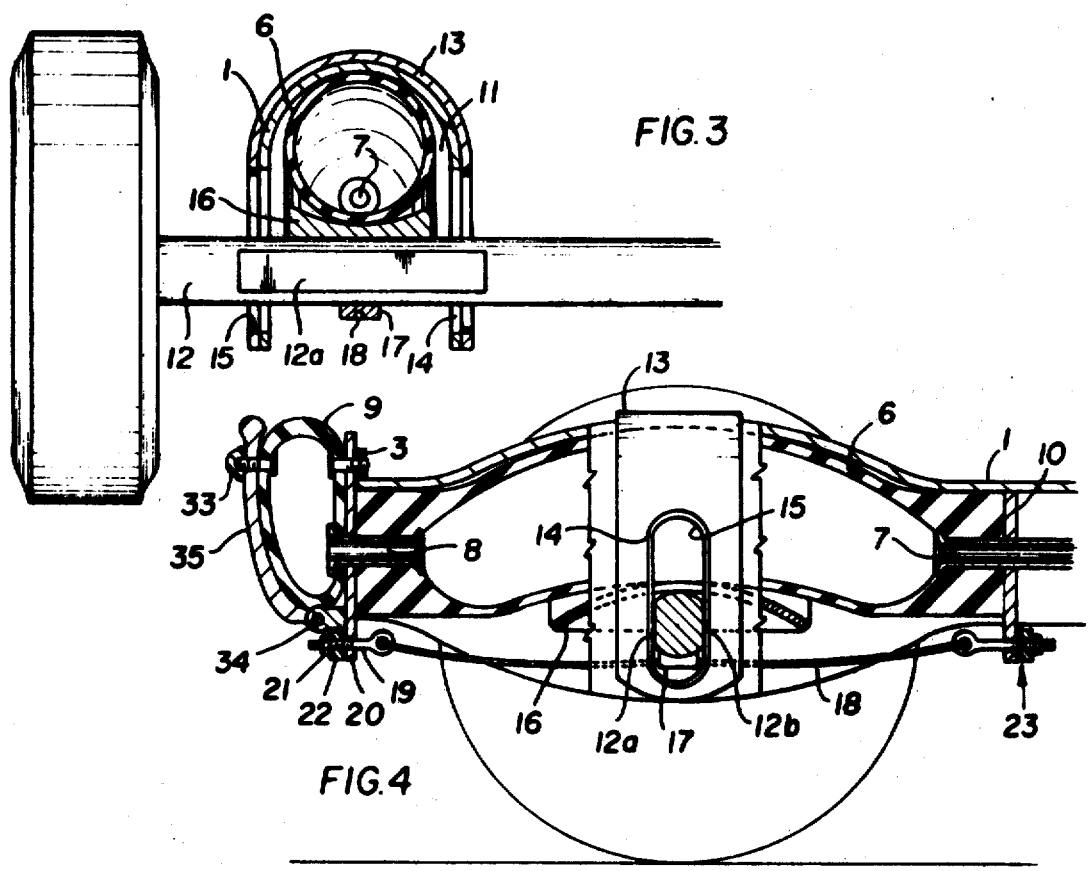
FIG. 3
FIG. 4
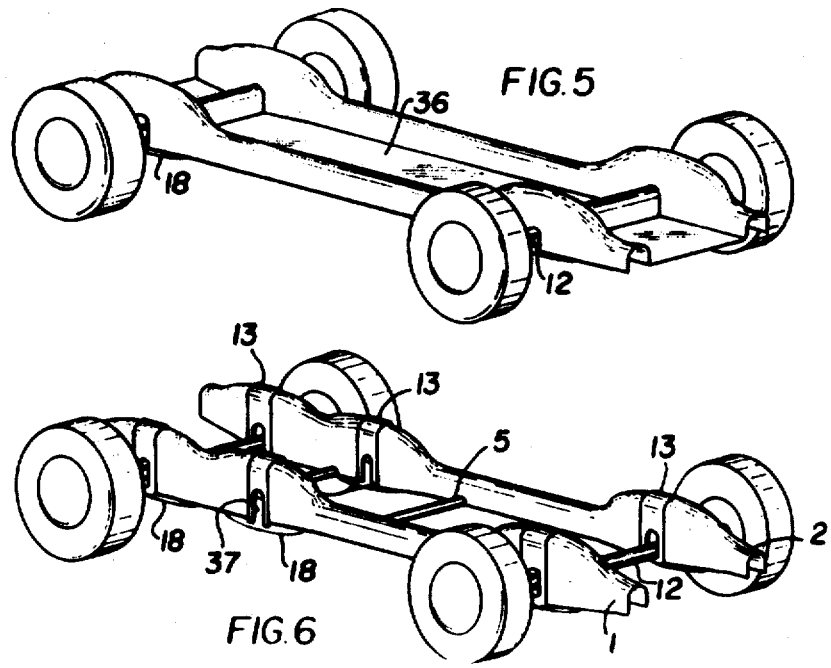
FIG. 5
FIG. 6

COMBINED VEHICLE CHASSIS AND AIR SUSPENSION SYSTEM

This invention relates to vehicle air suspensions, and more particularly, to a combined vehicle chassis and air suspension system of simplified design. Further, this invention particularly relates to a safety bumper in combination with the air suspension.

In most vehicles, the chassis is formed separate and apart from the suspension system. The components of the suspension system are generally attached to the chassis members during construction of the vehicle. This requires that numerous suspension components be individually fabricated and mounted to the chassis of the vehicle, thereby increasing costs and increasing the time required to assemble a vehicle.

The main object of the present invention is to provide a combined vehicle chassis and air suspension which is easily manufactured, requires a reduced number of individual components, which is easily assembled and which is reliable in use.

A further object of the present invention is to provide an air suspension system which is self-aligning to unbalanced loads and which has improved performance characteristics.

Still another object of the present invention is to integrate a safety air bumper with the air suspension system to enhance the shock and impact adsorption characteristics of the bumper and to enhance the performance of the suspension system.

SUMMARY OF THE INVENTION

In accordance with the present invention, a combined vehicle chassis and air suspension system comprises a chassis member having a generally inverted U-shaped cross-section, an elongated flexible air bag located within and supported by the U-shaped chassis member such that under no-load conditions, the elongated air bag contacts the chassis member on only a portion of the circumference thereof which is surrounded by the U-shaped chassis member. The side portions of the U-shaped chassis member are spaced from the sides of the air bag under no-load conditions and under loaded conditions, or when the vehicle turns around a curve, the side portions of the U-shaped members bear against the air bags, thereby preventing sidesway of the vehicle.

In accordance with a further aspect of this invention, safety air-bumpers are provided which are in air-communication with the air in a suspension system air bag. The air in the air bumpers acts as an additional air reservoir for the air bags of the suspension system to effectively soften the ride of the vehicle and enhance the performance of the suspension system. Additionally, the air bumper absorbs vehicle impacts. The air in the suspension system enhances the impact absorption characteristics of the bumper.

DRAWINGS

FIG. 1 is a perspective view generally illustrating a vehicle chassis embodying the principles of the present invention;

FIGS. 2a and 2b are top sectional views of embodiments of the present invention;

FIG. 3 is a cross-sectional view taken along the line 3—3 of FIG. 2a;

FIG. 4 is a cross-sectional view taken along the line 4—4 of FIG. 2a;

FIG. 5 is a perspective view of another type of vehicle chassis embodying the principles of the present invention; and FIG. 6 is a perspective view of a modification of the present invention.

DETAILED DESCRIPTION OF THE DRAWINGS

Referring to FIG. 1, one embodiment of a vehicle chassis embodying the principles of the present invention is comprised of inverted, generally U-shaped chassis members 1 and 2 which are spaced from each other and which are secured to a front chassis member 3 and to a rear chassis member 4 by, for example, welding. Cross members 5 are provided if additional strength is required, depending upon the particular design of the vehicle and upon the particular materials used. Cross members 5 need not be perpendicular to the U-shaped members 1 and 2 as shown in FIG. 1. They may take any shape or form and may be connected in any desired manner in order to provide the appropriate structural strength required in the vehicle.

The embodiment shown in FIG. 1 is simplified and generally illustrates the concept of the present invention in schematic form. The various braking drive, steering, etc. mechanisms are not shown in FIG. 1 so as not to unduly complicate the drawing. Conventional steering, braking and drive mechanisms may be used as should be apparent to those skilled in the art. For example, front or rear-wheel drive may be used, and independent wheel suspensions may be used.

Referring now to FIGS. 2a, 3 and 4, a specific embodiment of the invention will be described in detail. Mounted within the U-shaped chassis member 1 is an air bag 6 which is elongated in shape and which is comprised preferably of rubber or other suitable air retaining flexible material. The air bag 6 includes an air line 7 which is connected to the air supply system of the suspension which is shown schematically at 8. The air supply system 8 is conventional and is exemplified, for example, in U.S. Pat. No. 3,104,679. The air line 7 is retained in air bag 6 by means of flange 7a which is preferably bonded to the rubber of air bag 6. An air line 8 with flange 8a is provided at the other end of air bag 6 and communicates with an air bag 9 which comprises part of the front bumper of the vehicle. Air line 8 has a flange 8b which is inserted in an opening in the bumper air bag 9 and is retained within air bag 9 by means of pressure acting on the flange as shown in FIG. 2a. Other suitable air line connections to the air bags 6 and 9 may be used as desired. The illustrated air lines are shown only by way of example.

The air bag 6 is retained in position within the U-shaped chassis member 1 at the front end by abutting against the face of chassis member 3, and at the rear end by a flange 10 which is connected to the inside of the U-shaped chassis member 1. Flange 10 may be a part of the chassis member 1 and have an opening to receive the air line 7 therein or may be integral with the air bag 6 and secured during installation to the chassis member 1.

Air bag 6 is designed such that under no-load conditions on the vehicle, there is a space 11 between the side walls of the U-shaped chassis member 1 and the air bag. This is most clearly seen in FIg. 2a and 3. Functioning of the air bag in connection with the side walls of the chassis member 1 will be explained hereinbelow.

As is best seen in FIGS. 3 and 4, below the air bag 6 is mounted the axle 12 of the vehicle. The axle 12 is shown schematically in the Figures and it should be clear that the axle 12 may various other forms and may comprise independent front suspension members with the appropriate steering apparatus as is well known in the art. Axle 12 may also have a square cross-section. An inverted U-shaped reinforcing member 13 is secured to U-shaped chassis member 1 to reinforce the portion of the chassis which carries the suspension. Reinforcing member 13 may also be formed integral with the chassis member 1. In certain instances, it may be possible to provide enough structural strength in the chassis member 1 and reinforcing member 13 could be eliminated. In this latter event, the chassis member 1 would be designed to perform the functions of reinforcing member 13 which are described below.

The axle 12 passes through a journal 14 in U-shaped member 13 and through a corresponding journal or opening in the U-shaped chassis member 1. In order to provide additional cushioning, the journal 14 may be lined with rubber 15 or the like. Preferably the axle 12 has straight sides 12a and 12b which engage the rubber lining of journal 14 to help prevent rotation of axle 12 during braking of the wheel. The axle 12 is loosely retained in position in journal 14 relative to the chassis member 1, thereby allowing movement of the axle 12 relative to the chassis member 1. Also secured to the axle 12 is a gently curved saddle 16 which bears against the lower surface of the air bag 6. This can be more clearly seen by referring to FIGS. 3 and 4. Preferably, the surface of saddle 16 which bears against the air bag 6 is curved to generally conform with the shape of the air bag 6. Under no-load condition only a portion of saddle 16 contacts air bag 6 as is shown in FIG. 4. As the load increases, the contact area therebetween likewise increases.

Secured to the lower portion of axle 12 is a cable guide block 17 over which passes a flexible cable 18. The flexible cable preferably engages a mating slot in block 17. Alternatively, cable 18 may pass through a hole and block 17 or may be integrally formed therewith. One end of the cable 18 is formed as a bolt 19 which passes through a hole in a chassis protrusion 20. The bolt 19 is secured to the chassis portion 20 by means of a nut 21 engaging bolt 20. A bush 22 is interposed between the nut and the protruding chassis member 20 in order to provide cushioning and shock absorption. The other end of the cable is secured to the chassis member 1 in a manner similar to that described above for the first end of cable 18. The connection of the other end of cable 18 to the chassis 1 is generally shown at 23. One or both of the nuts engaging the bolt portions of cable 18 is made adjustable in order to adjust the tension of cable 18. The purpose of cable 18 is to prevent the axle from dropping too low and to flexibly absorb impacts when the axle rebounds. This prevents undue wear on the lower portions of the reinforcing member 13 which form the lower portions of the journal 14.

By virtue of the above described construction, there is obtained an improved vehicle suspension system which is self-aligning under unbalanced load conditions. This helps prevent drag on the wheels (especially on the back wheels) under unbalanced loads by virtue of the "floating" nature of the suspension system. This enables the suspension system to self-adjust by allowing relative movement of the axle with respect to the chassis under varying load conditions. In addition to the shock absorption characteristics of cable 18, cable 18 also functions under braking operations of the vehicle to help maintain the suspension components in proper relative positions.

It should be clear that various other suspension arrangements may be used with the present invention. For example, the above described embodiment could be used as the rear suspension of a vehicle using a common axle for both rear wheels and the front suspension may be designed having independent front wheel suspension. In any event, the concepts of the present invention discussed above are applicable.

FIG. 2b illustrates a modified embodiment of the air bag construction shown in FIGS. 2a, 3 and 4. The operation of the construction of FIG. 2b is the same as the construction discussed above. In FIG. 2b, the inverted, U-shaped chassis member 1 comprises a straight member and does not include a bulge out portion in the vicinity of the air bag 6 as in the embodiment of FIG. 2a. In certain instances, the fabrication of such a straight-type chassis member 1 may be simpler and more desirable. In FIG. 2b, elements corresponding to those elements discussed above in the previous embodiment are given the same reference numerals.

The air bag 6 has flange portions 6a and 6b and includes air lines 25 and 26 extending therefrom and bonded thereto. Flanges 25a and 26a retain lines 25 and 26, respectively, in the air bag 6. Air lines 25 and 26 include threaded portions which are passed through openings in chassis plates 10 and 27 which are attached to chassis 1. Preferably, the opening in plate 27 through which the air line 25 passes is slotted to enable the structure to be more easily put together. The air line 25 extends into the bumper air bag 9 and is retained in position by pressure and by flange 25b. The air bag is positively retained in position by means of nuts 28 and 29 which threadably engage lines 25 and 26, respectively. Interposed between the nut 29 and the plate 10 is a rubber washer 30 and a metallic or other rigid material washer 31. This adds resilience to the mounting apparatus. If desired, a rubber washer similar to washer 30 may be interposed between nut 28 and plate 27 at the other end of the air bag.

As in the embodiment of FIG. 2a, a space 11 is provided between the side walls of the chassis member 1 and the air bag 6 when the vehicle is under no-load. As mentioned above, the operation of this embodiment is similar to that of FIG. 2a and a detailed discussion thereof is not deemed necessary for an understanding of this embodiment of the invention.

In operation, a small space 11 is provided between the side walls of the U-shaped chassis member and the air bag. Also, the upper portion of the U-shaped chassis member does not fully contact the air bag 6 under no-load conditions. As the load is increased, the air bag flexes and begins to contact a larger surface area of the U-shaped chassis member. Also, as the load is increased, a larger portion of the curved saddle 16 begins to contact the air bag 6 to provide larger bearing surfaces. When the vehicle is subjected to sway or when the vehicle is turning, the air bag contacts the side walls of the U-shaped chassis member 1 to prevent undesirable sway of the vehicle. The curvature of the saddle 16 (as seen in FIG. 3) also helps prevent side sway. This design provides greatly improved results and is relatively simple in construction. If desired, the air bags 6 may be physically secured to the U-shaped chassis members 1 and 2 by means of bolts molded into the air bags and extending therefrom, by bonding, or the like. Likewise the air bags may be secured to the saddle 16.

The present invention further comprises an air bumper which is preferably provided at both the front and rear of the vehicle. The air bumper, which is shown in detail in FIGS. 2a, 2b and 4 comprises an air bag 9 which is an air communication with the suspension system via air lines 8 and 25 as shown in FIGS. 2a and 2b. The air bag 9 is preferably bolted to the vehicle chassis plate 3 by means of bolts molded to and/or bonded to the air bag 9. One such bolt assembly 33 is shown in FIG. 2a merely by way of example. Alternatively, the air bag 9 may be bonded or adhesively secured to chassis plate 3.

Pivotally secured by means of pivot 34 to the plate 3 is a front bumper member 35 which is also preferably bolted or bonded and/or adhesively secured to the air bag 9. The front bumper member 35 preferably covers substantially all of the outer surface area of air bag 9 and wraps around the end of air bag 9 to protect same for example as indicated at 36. The air bag 9 will effectively absorb most low intensity impacts received by the vehicle against bumper member 35. The operation of the bumper should be apparent from the illustration in FIGS. 2a, 2b and 4.

In order to enhance the shock absorption capabilities of the bumper, and in order to simultaneously enhance the vehicle riding characteristics of the suspension system, the air bag 9 of the bumper is in air communication with the air bag 6 of the suspension system. Thus, the bumper effectively acts as a reservoir for the air bag 6 and effectively provides a greater volume of air for use in the suspension system itself. This will enhance the shock absorption characteristics of the suspension system. Likewise, the volume of air contained in the air bag of the suspension system will also effectively increase the volume of air contained within the bumper and thereby enhance the shock absorption characteristics of the bumper. By placing a "slow-return" type of valve in air line 8, for example, the system acts to provide good "shock absorber" characteristics and eliminates the need for a separate shock absorber. This is a safety feature of the present invention and provides improved overall performance of both the bumper and the suspension system.

Preferably, a valve is included in the air lines leading to the front air bags of the suspension system in order to limit the air pressure therein. As the loads on the vehicle are increased, the air pressure in the suspension system is likewise increased in order to support the additional load. A limit valve in the air lines to the front air suspension prevents the front suspension from being over inflated. As the load increases, it is necessary to only increase the pressure of the rear suspension air bags in order to safely carry same.

While the bumper arrangements discussed above have been described only with respect to the front suspension, it should be clear that a similar arrangement could be used on the rear of the vehicle and that the bumper air bag is in communication with the air bag of the rear suspension of the vehicle. The bumper arrangement discussed above is equally useful with passenger cars and with trucks.

The air supply 32 is conventional and is not discussed herein in detail.

The present invention lends itself to use with a one-piece molded construction chassis, a typical example of which is shown in FIG. 5. The one piece chassis of FIG. 5 includes longitudinal members corresponding to members 1 and 2 of FIGS. 1–4 and a centrally located center pan which provides structural strength and encloses the bottom of the vehicle. The drive for the vehicle may be located in either the front or rear open portions of the chassis, as desired.

If the present invention is utilized in a truck or other vehicle which carries relatively heavy loads, the chassis members 1 and 2 preferably include portions readily adaptable to receive an additional axle intermediate the front and rear wheels. Such a modification is schematically illustrated in FIG. 6. While FIG. 6 shows chassis members 1 and 2 in the form of those of FIG. 2a, it should be clear that straight-type inverted U-shaped chassis members such as shown in FIG. 2b may be used. This would provide greater structural strength and would more readily be adaptable to receive additional axle and wheel assemblies at various intermediate locations, as desired. For example, the chassis member 1 may include an additional reinforcing member 13 secured thereto at a position intermediate the front and rear wheels. The appropriate journals will be provided and also, the appropriate plates (such as plates 10 and 27 of FIG. 2b) are provided interior of member 1 for mounting of an air bag. If desired, the air bag may be permanently mounted in the additional position intermediate the front and rear wheels and may be permanently connected to the air supply system 32.

In the event that the vehicle having such an intermediate axle position is required to carry very heavy loads, it is a simple matter to install an additional axle and wheel assembly to help support such loads. In this type of embodiment, the journal 14 in the chassis member 1 and in the reinforcing member 13 is preferably slot shaped with an open bottom so that an axle may be easily engaged therein by passing it through the bottom opening of the slot. The additional axle will have a saddle 16 already secured thereto for bearing against the air bag. After insertion of the axle into the journal in the intermediate position, it is only necessary to secure the flexible cable at both ends to the chassis by means of chassis protrusions (such as protrusion 20 of FIG. 4) and threaded bolts as is shown in FIG. 4. The flexible cable will retain the additional axle and wheel assembly in its proper relative position even under severe rebounding conditions.

The above described embodiment which includes an intermediate wheel and axle position is advantageously used on trucks and large trailers which are required to periodically carry heavy loads. By virtue of the present invention, additional axle and wheel assemblies are quickly and easily added to safely carry the additional loads as required. When the load is removed, it is also a simple matter to remove an additional wheel and axle assembly to prevent undue wear on the additional wheels which are now no longer needed.

A typical embodiment, for example, that shown in FIGS. 1, 2a, 3 and 4 for use in an automobile could use suspension air bags having a length of approximately 28—30 inches and a diameter of approximately 8 or 9 inches. Variations in the bag dimension will vary the ride characteristics of the vehicle. Typical air pressures in such an embodiment would be approximately 8–10 lbs. at no load. Variations in air pressure will vary vehicle height and vehicle ride characteristics. Automatic control can be provided, as is known, to vary air pressure in response to changes in load when the vehicle is static.

The term "air" is used in this specification and in the claims for convenience. It should be clear that any other suitable fluid medium, such as gases or liquids, may be used to practice the concepts of this invention disclosed and claimed in the appended claims.

I claim:

1. A safety air-bumper for use in a vehicle having an air suspension system which includes at least one air spring comprising:
    a first bumper plate member coupled to the end of a vehicle chassis;
    a second bumper plate member;
    an elongated bumper air bag interposed between said first and second bumper plate members, said bag comprising resilient material substantially entirely surrounding the air contained therein;
    means for coupling said bumper air bag in communication with the air spring of said air suspension system; and,
    said elongated bumper air bag being secured to said first and second bumper plate members.

2. A safety air bumper according to claim 1 wherein said second bumper plate member is pivotally secured to said first bumper plate member.

3. A safety air-bumper according to claim 1, wherein said air bag is secured to said first and second bumper plate members by spaced bolts molded in the resilient material of said air bag.

4. A safety air-bumper according to claim 1, wherein said air bag is secured to said first and second bumper plate members by adhesive bonding.

5. A safety air-bumper according to claim 1, wherein said air bag is secured to said first and second bumper plate members by spaced bolts molded in said air bag and by adhesive bonding.

6. A safety air-bumper according to claim 1 and slow return valve means incorporated in said means for coupling said bumper air bag in communication with the air spring of said air suspension system.

7. A safety air-bumper according to claim 6, wherein said second bumper plate member is pivotally secured to said first bumper plate member.

8. A safety air-bumper according to claim 7, wherein said air bag is secured to said first and second bumper plate members by spaced bolts molded in said air bag.

9. A safety air-bumper according to claim 7, wherein said air bag is secured to said first and second bumper plate members by bonding with adhesive.

* * * * *